US008207718B2

(12) United States Patent
Zhao et al.

(10) Patent No.: US 8,207,718 B2
(45) Date of Patent: Jun. 26, 2012

(54) SWITCHING POWER SUPPLY CIRCUIT

(75) Inventors: Li-Jun Zhao, Shenzhen (CN); Tong Zhou, Shenzhen (CN)

(73) Assignees: Innocom Technology (Shenzhen) Co., Ltd., Shenzhen (CN); Chimei Innolux Corporation, Miaoli County (TW)

( * ) Notice: Subject to any disclaimer, the term of this patent is extended or adjusted under 35 U.S.C. 154(b) by 651 days.

(21) Appl. No.: 12/378,301

(22) Filed: Feb. 13, 2009

(65) Prior Publication Data
US 2009/0207634 A1 Aug. 20, 2009

(30) Foreign Application Priority Data

Feb. 15, 2008 (TW) ................................ 97105345 A

(51) Int. Cl.
*G05F 1/00* (2006.01)
(52) U.S. Cl. ........................................ 323/266; 323/270
(58) Field of Classification Search .......... 323/266–272; 363/21.12–21.18; 307/80, 82
See application file for complete search history.

(56) References Cited

U.S. PATENT DOCUMENTS

| 5,138,543 A * | 8/1992 | Harm et al. ................ 363/21.08 |
| 5,982,638 A * | 11/1999 | Tang et al. ...................... 363/16 |
| 6,426,886 B1 * | 7/2002 | Goder ........................ 363/21.18 |
| 6,566,766 B2 * | 5/2003 | Matsuda et al. ................ 307/82 |

FOREIGN PATENT DOCUMENTS

| CN | 1815867 A | 8/2006 |
| CN | 2805207 Y | 8/2006 |
| JP | 8-116669 A | 5/1996 |

* cited by examiner

*Primary Examiner* — Jue Zhang
(74) *Attorney, Agent, or Firm* — WPAT., P.C.; Justin King

(57) ABSTRACT

An exemplary switching power supply circuit includes a transformer, a switching control circuit, a DC-DC converter, and a signal selecting circuit. The transformer converts a DC voltage into a first DC voltage and a second DC voltage. The switching control circuit controls a current flowing on the transformer for generating the first DC voltage and the second DC voltage. The DC-DC converter converts the first DC voltage or the second DC voltage into a third DC voltage. The signal selecting circuit selects the first DC voltage or the second DC voltage for the DC-DC converter to generate the third DC voltage.

15 Claims, 2 Drawing Sheets

SWITCHING POWER SUPPLY CIRCUIT

FIELD OF THE DISCLOSURE

The present disclosure relates to a switching power supply circuit.

BACKGROUND

A switching power supply circuit has better linear characteristic, consumes low power, transforms electrical power efficiently, and works steadily. Therefore, the switching power supply is commonly used in an LCD TV, the display device, and other consumer products.

FIG. 2 shows a typical switching power supply circuit. The switching power supply circuit 10 includes a first rectifying filtering circuit 11, a first transformer 12, a second rectifying filtering circuit 13, a first direct-current (DC) voltage output port 136, a third rectifying filtering circuit 14, a second DC voltage output port 146, a first switching control circuit 15, a first feedback circuit 161, a second transformer 18, a fourth rectifying filtering circuit 17, a third DC voltage output port 176, a second switching control circuit 19, and a second feedback circuit 162.

The first rectifying filtering circuit 11 includes a full bridge-rectifier circuit 111, a first filtering capacitor 112, two input terminals 113, 114, and an output terminal 115. The two input terminals 113, 114 receive an external alternating current (AC) voltage, and the full bridge-rectifier circuit 111 transforms the AC voltage into a DC voltage. The first filtering capacitor 112 has one end grounded, and the other end connected to the output terminal 115.

The first transformer 12, including the first primary winding 121 and the first secondary winding 122, receives the DC voltage and outputs a first induced voltage and a second induced voltage. The first primary winding 121 has a terminal "a" and a terminal "b", in which the terminal "a" is connected to the output terminal 115 of the first rectifying filtering circuit 11, and the terminal "b" is grounded through the first switching control circuit 15. The first secondary winding 122 includes a terminal "c", a terminal "d", and a terminal "e", in which the terminal "c" is connected to the second rectifying filtering circuit 13, the terminal "d" is connected to the third rectifying filtering circuit 14, and the terminal "e" is grounded.

The first switching control circuit 15 includes a first pulse width modulation (PWM) chip 151, a first transistor 152, and a first resistor 154. The PWM chip 151 includes a first voltage sampling terminal 153 and a first control terminal 155. The first voltage sampling terminal 153 receives a feedback signal. The first control terminal 155 provides a first pulse signal to a gate of the first transistor 152. A source of the first transistor 152 is grounded through the first resistor 154, and a drain of the first transistor 152 is connected to the terminal "b" of the first primary winding 121. The first transistor 152 is an N channel metal oxide semiconductor field effect transistor (NMOSFET) of enhanced type.

The second rectifying filtering circuit 13 outputs a first DC voltage, in which the second rectifying filtering circuit 13 includes a first inductor 131, a first storage capacitor 132, a second filtering capacitor 135, a first rectifying diode 133, and a second rectifying diode 134. Anodes of the first rectifying diode 133 and the second rectifying diode 134 are connected to the terminal "c" of the first secondary winding 122, and cathodes of the first rectifying diode 133 and the second rectifying diode 134 are connected to the first DC voltage output port 136. The first inductor 131 has one end serially connected to one end of the first storage capacitor 132, and the other end connected to the terminal "c" of the first secondary winding 122. The other end of the first storage capacitor 132 is connected to the first DC voltage output port 136. The second filtering capacitor 135 having one end connected to the first DC voltage output port 136, and the other end grounded.

The third rectifying filtering circuit 14 outputs a second DC voltage, in which the third rectifying filtering circuit 14 includes a second inductor 141, a second storage capacitor 142, a third filtering capacitor 145, a third rectifying diode 143, and a fourth rectifying diode 144. Anodes of the third rectifying diode 143 and the fourth rectifying diode 144 are connected to the terminal "d" of the first secondary winding 122, and cathodes of the third rectifying diode 143 and the fourth rectifying diode 144 are connected to the second DC voltage output port 146. The second inductor 141 has one end serially connected to one end of the second storage capacitor 142, and the other end connected to the terminal "d" of the first secondary winding 122. The second storage capacitor 142 has the other end connected to the second DC voltage output port 146. The third filtering capacitor 145 has one end connected to the second DC voltage output port 146, and the other end grounded.

The first feedback circuit 161 receives the first DC voltage and the second DC voltage, generates a corresponding first feedback signal, and feedbacks the first feedback signal to the first voltage sampling terminal 153 of the PWM chip 151. The first feedback circuit 161 includes a first feedback input terminal 163, a second feedback input terminal 165, and a first feedback output terminal 167. The first feedback input terminal 163 is connected to the first DC voltage output port 136, and the second feedback input terminal 165 is connected to the second DC voltage output port 146. The first feedback output terminal 167 is connected to the first voltage sampling terminal 153 of the PWM chip 151.

The second transformer 18 receives the DC voltage and outputs a third induced voltage, in which the second transformer 18 includes a second primary winding 181 and a second secondary winding 182. The second primary winding 181 includes a terminal "o" and a terminal "p", in which the terminal "o" is connected to the output terminal 115 of the first rectifying filtering circuit 11, and the terminal "p" is grounded through the second switching control circuit 19. The second secondary winding 182 includes a terminal "r" and a terminal "s", in which the terminal "r" is connected to the fourth rectifying filtering circuit 17, and the terminal "s" is grounded.

The second switching control circuit 19 include a second PWM chip 191, a second transistor 192, and a second resistor 194. The second PWM chip 191 includes a second voltage sampling terminal 193 and a second control terminal 195. The second voltage sampling terminal 193 receives a feedback signal. The second control terminal 195 provides a second pulse signal to a gate of the second transistor 192. A source of the second transistor 192 is grounded through the second resistor 194, and a drain of the second transistor 192 is connected to the terminal "p" of the second primary winding 181. The second transistor 192 is an NMOSFET.

The fourth rectifying filtering circuit 17 outputs a third DC voltage, in which the fourth rectifying filtering circuit 17 includes a third inductor 171, a third storage capacitor 172, a fourth filtering capacitor 175, a fifth rectifying diode 173, and a sixth rectifying diode 174. Anodes of the fifth rectifying diode 173 and the sixth rectifying diode 174 are connected to the terminal "r" of the second secondary winding 183, and cathodes of the fifth rectifying diode 173 and the sixth rectifying diode 174 are connected to the third DC voltage output port 176. The third inductor 171 has one end serially connected to one end of the third storage capacitor 172, and the other end connected to the terminal "r" of the second secondary winding 182. The other end of the third storage capacitor 172 is connected to the third DC voltage output port 176. The fourth filtering capacitor 175 has one end connected to the third DC voltage output port 176, and the other end is grounded.

The second feedback circuit 162 receives the third DC voltage, generates a corresponding second feedback signal, and provides the second feedback signal to the second voltage sampling terminal 193 of the second PWM chip 191. The second feedback circuit 162 includes a third feedback input terminal 164 and a second feedback output terminal 166. The third feedback input terminal 164 is connected to the third DC voltage output port 176, and the second feedback output terminal 166 is connected to the second voltage sampling terminal 193 of the second PWM chip 191.

The switching power supply circuit 10 operates as follows:

The external AC voltage is inputted to the input terminals 113, 114 of the first rectifying filtering circuit 11, and is transformed into the DC voltage by the first rectifying filtering circuit 11. The DC voltage is then provided to the first primary winding 121 and the second primary winding 181 of the first transformer 12 and the second transformer 18 respectively. The first control terminal 155 of the PWM chip 151 outputs the first pulse signal for controlling a conduction of the first transistor 152, through which a current flowing through the first primary winding 121 is controlled, and a working state of the first transformer 12 is controlled as a result. The second control terminal 195 of the second PWM chip 191 outputs the second pulse signal for controlling a conduction of the second transistor 192, through which a current flowing through the second primary winding 181 is controlled, and a working state of the second transformer 18 is controlled as a result.

When the first transistor 152 is conducted, the first filtering capacitor 112, the first primary winding 121, the first transistor 152, and the first resistor 154 form a loop, thereby a first conducting current can flow through the first primary winding 121.

When the first transistor 152 is cut off, the first conducting current is consumed and becomes lesser, which induces a first induced magnetic field on the first primary winding 121. Influenced by the first induced magnetic field, the first induced voltage is generated on the terminal "c" of the first secondary winding 122, and the second induced voltage is also generated on the terminal "d" of the first secondary winding 122.

The first induced voltage is provided to the second rectifying filtering circuit 13. The first induced voltage is transformed into the first DC voltage through rectified and filtered by the second rectifying filtering circuit 13. The second induced voltage is provided to the third rectifying filtering circuit 14. The second induced voltage is transformed into the second DC voltage through rectified and filtered by the third rectifying filtering circuit 14. In addition, the first DC voltage and the second DC voltage from the first DC voltage output port 136 and the second DC voltage output port 146 are provided to the load (not shown). Furthermore, the first DC voltage and the second DC voltage are inputted to the first feedback circuit 161. The first feedback circuit 161 outputs the first feedback signal according the first DC voltage and the second DC voltage to the first voltage sampling terminal 153 of the PWM chip 151. The first PWM chip 151 regulates the first pulse signal according to the first feedback signal, so that the first DC voltage and the second DC voltage are also regulated accordingly, in which the first DC voltage is 24V, and the second DC voltage is 12V.

Similarly, when the second transistor 192 is conducted, the first filtering capacitor 112, the second primary winding 181, the second transistor 192, and the second resistor 194 form a loop, thereby a second conducting current can flow through the second primary winding 181.

When the second transistor 192 is cut off, the second conducting current is consumed and becomes lesser, which induces a second induced magnetic field on the second primary winding 181. Influenced by the second induced magnetic field, the third induced voltage is generated.

The third induced voltage is provided to the fourth rectifying filtering circuit 17. The third induced voltage is transformed into the third DC voltage through rectified and filtered by the fourth rectifying filtering circuit 17. In addition, the third DC voltage from the third DC voltage output port 176 is provided to a load (not shown). In addition, the third DC voltage is inputted to the second feedback circuit 162. The second feedback circuit 162 outputs the second feedback signal to the second PWM chip 191 according to the third DC voltage. The second PWM chip 191 regulates the second pulse signal according to the second feedback signal, so that the third DC voltage is also regulated accordingly, in which the third DC voltage is 5V.

As described above, the switching power supply circuit 10 controls the transformer 12 and the transformer 18 through the first PWM chip 151 and the second PWM chip 152 to get the first DC voltage, the second DC voltage, and the third DC voltage. However, the first PWM chip 151 and the second PWM chip 152 are the same type, which may cause the electromagnetic interference effect, and the stability of the switching power supply circuit 10 is affected as a result. Besides, the transformer 12 and the transformer 18 are heavy, which also makes the switching power supply circuit 10 heavy. Further, because the first PWM chip 151 and the second PWM chip 152 are costly, the cost of the switching power supply circuit 10 is increased as a result.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe the embodiments in detail.

Figure 1:
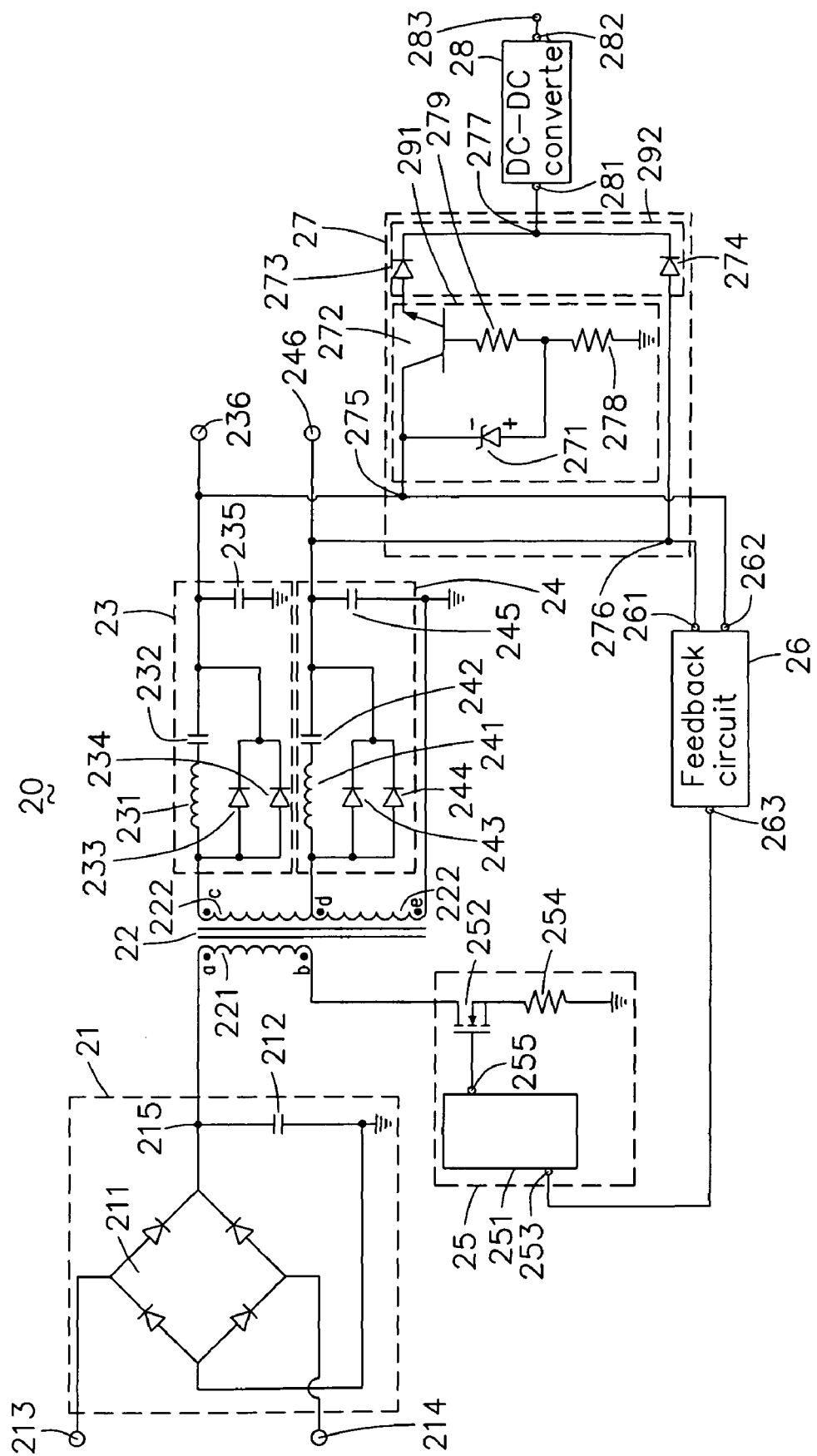
FIG. 1 shows a diagram of a switching power supply circuit according to an exemplary embodiment of the present disclosure.
Figure 2:
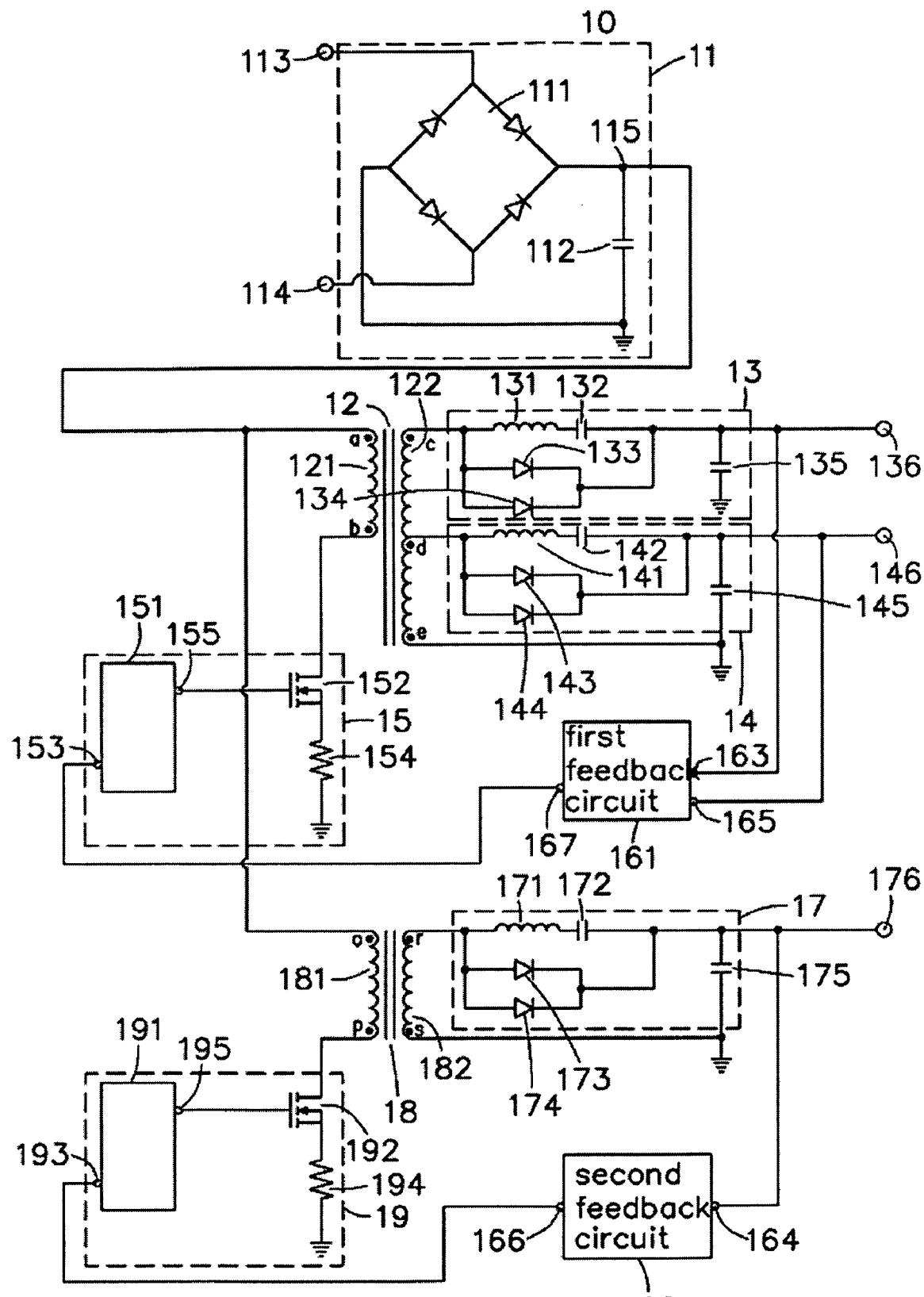
FIG. 2 shows a conventional diagram of the switching power supply circuit.

FIG. 1 shows a diagram of a switching power supply circuit according to an exemplary embodiment of the present disclosure. The switching power supply circuit 20 includes a transformer 22, a switching control circuit 25, a DC-DC converter 28 and a signal selecting circuit 27. The transformer 22 converts a DC voltage into a first DC voltage and a second DC voltage, in which the first DC voltage is outputted from a first DC voltage output port 236, and the second DC voltage is outputted from a second DC voltage output port 246.

The switching control circuit 25 controls a current flowing on the transformer 22 for generating the first DC voltage and the second DC voltage. The switching control circuit 25 includes a PWM circuit 251, a first transistor 252, and a resistor 254. The PWM circuit 251, generating a pulse signal, has a voltage sampling terminal 253 for receiving a feedback signal, and a control terminal 255 for providing the pulse signal to a gate of the first transistor 252. The first transistor 252 has the gate controlled by the pulse signal, a source electrically connected to ground through the resistor 254, and a drain electrically connected to a terminal "b" of a primary winding 221, in which the first transistor 252 is the NMOS-FET.

The signal selecting circuit 27 selects the first DC voltage or the second DC voltage for the DC-DC converter 28 to generate a third DC voltage. Then, the DC-DC converter 28 converts the first DC voltage or the second DC voltage selected by the signal selecting circuit 27 into a 5V third DC voltage, and the 5V third DC voltage is outputted from a third DC voltage output terminal 283. For example, the DC-DC converter 28 may transform a 12V second DC voltage selected by the signal selecting circuit 27V into 5V.

The DC-DC converter 28 includes a second signal output terminal 282 and a third signal input terminal 281. The second signal output terminal 282 is connected to the third DC voltage output terminal 283, in which the third DC voltage output terminal 283 provides the third DC voltage to a load (not shown). The third signal input terminal 281 is connected to a first signal output terminal 277 of the signal selecting circuit 27. The DC-DC converter 28 may be implemented with a chip AP1501, 1506, 1511, or LM7805 which can transform 12V DC voltage into 5V DC voltage.

The switching power supply circuit 20 further includes a first rectifying filtering circuit 21, a second rectifying filtering circuit 23, and a third rectifying filtering circuit 24. The first rectifying filtering circuit 21 transforms an AC voltage into the DC voltage for a primary winding 221 of the transformer 22. The first rectifying filtering circuit 21 includes a full bridge-rectifier circuit 211, a first filtering capacitor 212, two DC voltage input ports 213, 214, and an output terminal 215. The input ports 213, 214 receive the external AC voltage, and the full bridge-rectifier circuit 211 transforms the AC voltage into a DC voltage. The first filtering capacitor 212 has one end grounded, and the other end connected to the output terminal 215.

The transformer 22, including the primary winding 221 and a secondary winding 222, receives the DC voltage and outputs a first induced voltage. The primary winding 221 has a terminal "a" and a terminal "b", in which the terminal "a" is connected to the output terminal 215 of the first rectifying filtering circuit 21, and the terminal "b" is grounded through the switching control circuit 25. The secondary winding 222 includes a terminal "c", a terminal "d", and a terminal "e", in which the terminal "c" is connected to the second rectifying filtering circuit 23, the terminal "d" is connected to the third rectifying filtering circuit 24, and the terminal "e" is grounded.

The second rectifying filtering circuit 23 outputs the first DC voltage received from the terminal "c" of the secondary winding 222, in which the second rectifying filtering circuit 23 includes a first inductor 231, a first storage capacitor 232, a second filtering capacitor 235, a first rectifying diode 233, and a second rectifying diode 234. Anodes of the first rectifying diode 233 and the second rectifying diode 234 are connected to the terminal "c" of the secondary winding 222, and cathodes of the first rectifying diode 233 and the second rectifying diode 234 are connected to the first DC voltage output port 236. The first inductor 231 has one end serially connected to the first storage capacitor 232, and the other end connected to the terminal "c" of the secondary winding 222. The other end of the first storage capacitor 232 is connected to the first DC voltage output port 236. The second filtering capacitor 235 having one end connected to the first DC voltage output port 236, and the other end grounded.

The third rectifying filtering circuit 24 outputs the second DC voltage received from the fourth terminal "d" of the secondary winding 222, in which the third rectifying filtering circuit 24 includes a second inductor 241, a second storage capacitor 242, a third filtering capacitor 245, a third rectifying diode 243, and a fourth rectifying diode 244. Anodes of the third rectifying diode 243 and the fourth rectifying diode 244 are connected to the terminal "d" of the secondary winding 222, cathodes of the third rectifying diode 243 and the fourth rectifying diode 244 are connected to the second DC voltage output port 246. The second inductor 241 has one end serially connected to one end of the second storage capacitor 242, and the other end connected to the terminal "d" of the secondary winding 222. The second storage capacitor 242 has the other end connected to the second DC voltage output port 246. The third filtering capacitor 245 has one end connected to the second DC voltage output port 246, and the other end grounded.

The switching power supply circuit 20 further includes a feedback circuit 26 generating a feedback signal according to the first DC signal and the second DC signal, in which the PWM circuit 251 modulates the pulse signal according to the feedback signal.

The feedback circuit 26 receives the first DC voltage and the second DC voltage, generates the corresponding feedback signal, and feedbacks the feedback signal to the voltage sampling terminal 253 of the PWM chip 251. The feedback circuit 26 includes a first feedback input terminal 261, a second feedback input terminal 262, and a feedback output terminal 263. The first feedback input terminal 261 is connected to the first DC voltage output port 246, the second feedback input terminal 262 is connected to the second DC voltage output port 236. The feedback output terminal 263 is connected to the voltage sampling terminal 253 of the PWM chip 251.

The signal selecting circuit 27 decreases the first DC voltage, compares the decreased first DC voltage and the second DC voltage, and provides the DC voltage having the higher voltage value to the DC-DC converter 28. The signal selecting circuit 27 includes a first signal input terminal 275, a second signal input terminal 276, a signal output terminal 277, a buck circuit 291, and a logic circuit 292. The first signal input terminal 275 is connected to the first DC voltage output port 236, the second signal input terminal 276 is connected to the second DC voltage output port 246.

The buck circuit 291, decreasing the first DC voltage, includes a regulating diode 271, a resistor 278, a protect resistor 279, and a second transistor 272, in which the resistance of the protect resistor 279 is much less than the resistance of the resistor 278. The transistor 272 is an NPN bipolar junction transistor having a collector connected to the first signal input terminal 275, a base electrically connected to an anode of the regulating diode 271 through the protect resistor 279, and an emitter electrically connected to the first diode 273 of the logic circuit 292. A turn on voltage between the base and the emitter of the transistor 272 is about 0.7 V. The transistor 272 can also be a field effect transistor having a source electrically connected to a cathode of the regulating diode 271, a gate electrically connected to the anode of the regulating diode 271 through the protect resistor 279, and a drain electrically connected to the logic circuit 292.

The cathode of the regulating diode 271 is connected to first signal input terminal 275, and the cathode of the regulating diode 271 is grounded through the resistor 278. The turn on voltage of the regulating diode 271 is equal to the voltage difference between the first DC voltage and the second DC voltage. For example, if the first DC voltage is 24V, and the second DC voltage is 12V, then the turn on voltage of the regulating diode 271 is 12V, and the DC-DC converter 28 converts the 12V into 5V. The regulation diode can also be a zener diode, in that case the breakdown voltage of the zener diode is equal to the voltage difference between the first DC voltage and the second DC voltage.

The logic circuit 292, which compares the decreased first DC voltage and the second DC voltage and selects the one having the greater voltage value for the DC-DC converter 28, includes a first diode 273 and a second diode 274. The first diode 273 having a cathode connected to the signal output terminal 277. The second diode 274 has an anode receiving the second DC voltage and electrically connected to the second signal input terminal 276, and a cathode electrically connected to the signal output terminal 277 and the DC-DC converter 28.

The switching power supply circuit 20 operates as follows:

The external AC voltage is inputted to the input port 213 and the input port 214 of the first rectifying filtering circuit 21, and is transformed into the DC voltage through rectified and filtered by the first rectifying filtering circuit 21. The DC voltage is then provided to the primary winding 221 of the transformer 22. The control terminal 255 of the PWM chip 251 outputs the pulse signal for controlling a conduction of the first transistor 252, through which current flowing on the primary winding 221 of the transformer 22 is controlled, and a working state of the transformer 12 is controlled as a result.

When the first transistor 252 is conducted, the first filtering capacitor 212, the primary winding 221, the first transistor 252, and the resistor 254 form a loop, through which the conducting current can flow through the primary winding 221.

When the first transistor 252 is cut off, the conducting current on the primary winding 221 is consumed and becomes lesser, which induces the induced magnetic field on the primary winding 221. Influenced by the induced magnetic field, a first induced voltage is generated on terminal "c" of the secondary winding 222, and a second induced voltage is generated on terminal "d".

The first induced voltage is provided to the second rectifying filtering circuit 23. The first induced voltage is transformed into the first DC voltage through rectified and filtered by the second rectifying filtering circuit 23. The second induced voltage is provided to the third rectifying filtering circuit 24. The second induced voltage is transformed into the second DC voltage through rectified and filtered by the third rectifying filtering circuit 24. In addition, the first DC voltage and the second DC voltage from the first DC voltage output port 236 and the second DC voltage output port 246 are provided to the load (not shown). On the other hand, the first DC voltage and the second DC voltage are inputted to the feedback circuit 26. The feedback circuit 26 outputs a feedback signal according the first DC voltage and the second DC voltage to the voltage sampling terminal of the PWM chip 251. The PWM chip 251 regulates the pulse signal according to the feedback signal, so that the first DC voltage and the second DC voltage are also regulated accordingly, in which the first DC voltage is 24v, and the second DC voltage is 12v.

The first DC voltage and the second DC voltage are provided to the signal selecting circuit 27 through the first signal input terminal 275 and the second signal input terminal 276.

Assume that the first DC voltage is V1, the second DC voltage is V2, the turn on voltage of the regulating diode 271 is Vd, and the turn on voltage between the base and the emitter of the second transistor 272 is Vbe. The second filtering capacitor 235, the regulating diode 271 and the resistor 278 form a loop, such that the voltage across the resistor 278 is V1−Vd. The first DC voltage is first decreased by the regulating diode 271, and decreased again by the second transistor 272, which makes the voltage appearing on the emitter of the second transistor 272 equal to V1−Vd−Vbe so called as V1'. If V1'>V2, the first diode 273 turns on, V1' is inputted to the DC-DC converter 28, and is converted into the third DC voltage provided to the load. On the contrary, if V1'<V2, the second diode 274 turns on, V2 is inputted to the DC-DC converter 28, and is converted into the third DC voltage provided to the load.

The switching power supply circuit 20 generates the first DC voltage, the second DC voltage, and the third DC voltage by the PWM chip, the signal selecting circuit, and the DC-DC converter. The PWM chip and the DC-DC converter are chips of different types, therefore, the electromagnetic interference effect caused by same type chips can be reduced, and the switching power supply circuit can be stable.

In addition, the switching power supply circuit according to the embodiment of the present disclosure can omit one transformer, such that the weight of the switching power supply circuit is reduced.

Further more, the cost of the signal selecting circuit and the DC-DC converter according to the embodiment of the present disclosure are less than the cost of the PWM circuit; in addition, the switching power supply circuit according to one embodiment of the present disclosure needs merely one feedback circuit, therefore the cost of the switching power supply circuit according to one embodiment of the present disclosure is reduced.

In the practical application, effected by the load and the input voltage, the first DC voltage and the second DC voltage might have −10%~+10% voltage offset. Because the power outputted from the transformer is a constant, the switching power supply circuit might be overloaded if the voltage outputted from the transformer is less than the standard voltage. Fortunately, the signal selecting circuit according to one embodiment of the present disclosure decreases the first DC voltage with the regulation diode and the second transistor, compares the decreased first DC voltage and the second DC voltage, and selects the DC voltage with the higher voltage value for the DC-DC converter by the first diode and the second diode, such that the overloaded effect due to the voltage offset can be prevented.

There are various implement ways for implementing the switching power supply circuit of the present disclosure, such as that the second transistor of the signal selecting circuit might be a field effect transistor.

It is to be understood that even though numerous characteristics and advantages of the present embodiments have been set forth in the foregoing description with details of the structures and functions of the embodiments, the disclosure is illustrative only, and changes made in detail, especially in matters of shape, size, and arrangement of parts, within the principles of the embodiments, to the full extent indicated by the broad general meaning of the terms in which the appended claims are expressed.

What is claimed is:

1. A switching power supply circuit, comprising:
a transformer converting a direct-current (DC) voltage into a first DC voltage and a second DC voltage;

a switching control circuit controlling current flowing on the transformer for generating a first DC voltage and a second DC voltage;

a DC-DC converter; and a signal selecting circuit comprising a buck circuit and a logic circuit, the buck circuit transforming the first DC voltage into a predetermined DC voltage to decrease the first DC voltage; and the logic circuit comparing and selecting one of the decreased first DC voltage and the second DC voltage to the DC-DC converter;

wherein the buck circuit comprises a transistor having a first terminal and a control terminal, a regulating diode electrically connected to the first terminal and the control terminal of the transistor for decreasing the first DC voltage, and a resistor electrically connected to the transistor, the regulating diode and a ground terminal, the DC-DC converter converts the decreased first DC voltage or the second DC voltage into a third DC voltage.

2. The switching power supply circuit of claim 1, wherein the predetermined DC voltage is substantially equal to the first DC voltage subtract the second DC voltage.

3. The switching power supply circuit of claim 2, wherein the DC-DC converter converts 12V into 5V.

4. The switching power supply circuit of claim 3, wherein the turn on voltage of the regulating diode is 12V.

5. The switching power supply circuit of claim 1, wherein the regulation diode is a zener diode, and the breakdown voltage of the zener diode is equal to the voltage difference between the first DC voltage and the second DC voltage.

6. The switching power supply circuit of claim 1, wherein the transistor is a bipolar junction transistor having a collector as the first terminal electrically connected to the cathode of the regulating diode, a base as the control terminal electrically connected to the anode of the regulating diode, and an emitter electrically connected to the logic circuit.

7. The switching power supply circuit of claim 1, wherein the transistor is a field effect transistor having a source as the first terminal electrically connected to the cathode of the regulating diode, a gate as the control terminal electrically connected to the anode of the regulating diode, and a drain electrically connected to the logic circuit.

8. The switching power supply circuit of claim 1, wherein the logic circuit comprises:

a first diode having an anode electrically connected to a second terminal of the transistor and a cathode electrically connected to the DC-DC converter; and a second diode having a anode receiving the second DC voltage and a cathode electrically connected to the DC-DC converter.

9. The switching power supply circuit of claim 1, wherein the transformer comprises:

a primary winding receiving the DC voltage; and a secondary winding having a third terminal for providing the first DC voltage and a fourth terminal for providing the second DC voltage.

10. The switching power supply circuit of claim 9, further comprising a first rectifying filtering circuit transforming an alternating-current voltage into the DC voltage for the primary winding of the transformer.

11. The switching power supply circuit of claim 9, further comprising:

a second rectifying filtering circuit outputting the first DC voltage received from the third terminal of the secondary winding; and a third rectifying filtering circuit outputting the second DC voltage received from the fourth terminal of the secondary winding.

12. The switching power supply circuit of claim 9, wherein the switching control circuit comprises:

a pulse width modulation circuit generating a pulse signal; and a second transistor having a gate controlled by the pulse signal, a source electrically connected to the ground terminal through a resistor, and a drain electrically connected to a second terminal of the primary winding.

13. The switching power supply circuit of claim 12, further comprising a feedback circuit generating a feedback signal according to the first DC signal and the second DC signal, wherein the pulse width modulation circuit modulates the pulse signal according to the feedback signal.

14. A switching power supply circuit, comprising:

a DC voltage input port providing a DC voltage;

a switching control circuit;

a transformer receiving the DC voltage from the DC voltage input port and converting the DC voltage into a first DC voltage and a second DC voltage according the controlling of the switching control circuit;

a DC-DC converter; and a signal selecting circuit transforming the first DC voltage into a predetermined DC voltage to decrease the first DC voltage, comparing the decreased first DC voltage and the second DC voltage, and selecting one of the second DC voltage and the decreased first DC voltage with the higher voltage value for the DC-DC converter to generate the third DC voltage, the signal selecting circuit comprising:

a buck circuit transforming the first DC voltage into the predetermined DC voltage to decrease the first DC voltage, the buck circuit comprising:

a transistor having a first terminal, a control terminal, and a second terminal;

a regulating diode having a cathode electrically connected to the first terminal of the transistor, and having an anode electrically connected to the control terminal of the transistor, wherein the cathode receives the first DC voltage; and a resistor having a first terminal electrically connected to the control terminal of the transistor, and having a second terminal electrically connected to a ground terminal, a logic circuit comparing a decreased first DC voltage and the second DC voltage and selecting the one having the higher voltage value for the DC-DC converter; and the logic circuit comprising:

a first diode having an anode electrically connected to the second terminal of the transistor and a cathode electrically connected to the DC-DC converter; and a second diode having an anode receiving the second DC voltage and a cathode electrically connected to the DC-DC converter.

15. The switching power supply circuit of claim 14, wherein the turn on voltage of the regulating diode is equal to the voltage difference between the first DC voltage and the second DC voltage.

* * * * *